United States Patent
Hs (10) Patent No.: US 10,807,438 B2
(45) Date of Patent: Oct. 20, 2020

(54) REFRIGERANT CHARGING USING WEIGHT AND FLOW RATE MEASUREMENTS

(71) Applicants: Bosch Automotive Service Solutions Inc., Warren, MI (US); Robert Bosch GmbH, Stuttgart (DE)

(72) Inventor: Mahendra Hs, Owatonna, MN (US)

(73) Assignees: Bosch Automotive Service Solutions Inc., Warren, MI (US); Robert Bosch GmbH, Stuttgart (DE)

( * ) Notice: Subject to any disclaimer, the term of this patent is extended or adjusted under 35 U.S.C. 154(b) by 151 days.

(21) Appl. No.: 16/111,936

(22) Filed: Aug. 24, 2018

(65) Prior Publication Data

US 2019/0061465 A1 Feb. 28, 2019

Related U.S. Application Data (60) Provisional application No. 62/552,613, filed on Aug. 31, 2017.

(51) Int. Cl.
| | | |
|---|---|---|
| *B60H 1/00* | (2006.01) | |
| *F25B 45/00* | (2006.01) | |
| *G01G 17/06* | (2006.01) | |
| *G01G 13/24* | (2006.01) | |

(52) U.S. Cl.
CPC ......... *B60H 1/00585* (2013.01); *F25B 45/00* (2013.01); *G01G 13/248* (2013.01); *G01G 17/06* (2013.01); *F25B 2345/001* (2013.01); *F25B 2345/005* (2013.01); *F25B 2345/007* (2013.01); *F25B 2500/19* (2013.01)

(58) Field of Classification Search
CPC .. B60H 1/00585; G01G 17/06; G01G 13/248; F25B 45/00; F25B 2345/005; F25B 2500/19; F25B 2345/007; F25B 2345/001
USPC .......................................................... 62/77
See application file for complete search history.

(56) References Cited

U.S. PATENT DOCUMENTS

| | | | |
|---|---|---|---|
| 3,200,605 A | | 8/1965 | Brody |
| 5,046,322 A | | 9/1991 | Bulla et al. |
| 5,249,434 A | * | 10/1993 | Abraham ........... B60H 1/00585 |
| | | | 62/149 |
| 7,086,237 B2 | | 8/2006 | Arshansky et al. |
| 7,210,300 B2 | | 5/2007 | Suharno et al. |
| 7,712,319 B2 | | 5/2010 | Braun, II et al. |
| 7,905,095 B2 | | 3/2011 | Suharno et al. |
| 8,661,836 B2 | | 3/2014 | Murray et al. |
| 9,074,805 B2 | | 7/2015 | McMasters |

(Continued)

FOREIGN PATENT DOCUMENTS

| | | |
|---|---|---|
| EP | 1635169 | 5/2010 |
| GB | 2151891 | 7/1985 |
| WO | 2014165248 | 10/2014 |

*Primary Examiner* — Steve S Tanenbaum
(74) *Attorney, Agent, or Firm* — David Kovacek; Maginot, Moore & Beck LLP (57) ABSTRACT

An air condition service machine for charging an air conditioner with refrigerant in a fast-charge mode, the fast-charge mode controlled based upon the changing weight rate of a refrigerant tank providing the supply of refrigerant to the air conditioner. The embodiment may also include a compensation mode to provide greater accuracy of the charge after completion of the fast-charge mode. The rate of refrigerant flow is monitored and an end time as opposed to weight target ends the charge.

12 Claims, 4 Drawing Sheets

(56) References Cited

U.S. PATENT DOCUMENTS

| | | |
|---|---|---|
| 9,207,006 B2 | 12/2015 | Brown et al. |
| 9,243,828 B2 | 1/2016 | Iyengar |
| 2010/0281890 A1 | 11/2010 | Govekar et al. |
| 2016/0123642 A1 | 5/2016 | Murray et al. |
| 2016/0169569 A1 | 6/2016 | Lundberg et al. |

* cited by examiner

REFRIGERANT CHARGING USING WEIGHT AND FLOW RATE MEASUREMENTS

TECHNICAL FIELD

This disclosure relates to filling a vehicle AC system with refrigerant, a process known as "charging." Charging of a vehicle AC system is an operation performed when servicing an air conditioning system. Charging operations are also part of a refrigerant recycling process, which require accurate charging of the air conditioner with new or recycled refrigerant.

BACKGROUND

An air conditioner service ("ACS") machine may be used to charge accurate amounts of refrigerant into an air conditioning system. At the start of a charge service, a charge amount to fill the air conditioning system is typically programmed into a controller on the ACS machine and the internal tank weight is noted. During the charging process, since most ACS machines have the refrigerant in the internal tank at a higher pressure than the interior of the air conditioning system, opening a set of charge solenoid valves between the two transfers refrigerant to the air conditioning system because of the pressure difference. Amount transferred is monitored and end of service is determined, and the charge solenoid valves are closed, when the transferred amount is greater than or equal to the programmed charge amount. In some embodiments, the charge accuracy may be required to be within a specified mass, e.g., ±15 grains.

In some prior solutions, to achieve a required accuracy, the charge process has been split into two or three stages—fast charge, slow charge and sometimes compensation. During fast charge, the charge solenoid valves are opened until a preset charge amount that is less than the final target amount is reached. In this mode transfer of refrigerant is faster due to the higher pressure difference, and tank weight scales on the ACS machines may not have the sensitivity to accurately keep up with the transfer amount. At the end of this stage, weight of the internal tank is noted and the amount remaining to charge is determined which will then be charged in the next stage by slow charge method.

During slow charge, the charge solenoid valves are operated in a pulse mode, wherein the solenoids are turned ON and OFF, modulating the valves for a slower refrigerant flow while the weight of the internal tank is monitored until the required charge target is achieved. The slow charge stage is at a rate allowing for the sensitivity of the tank scale to accurately charge the remaining amount. Although the second stage of a slower charge has increased accuracy, yet other ACS, machines have employed a compensation stage.

In the compensation stage, the amount that will remain in the hoses after disconnecting, from the air conditioning system is also charged from the internal tank. The amount charged during the compensation stage is often referred to as hose compensation. The hose compensation amount is a set constant within the programming of the controller of the ACS machine and is originally set depending on the length and cross-sectional volume of the hoses sold with the ACS machine. The concept here is that the ACS machine connecting hoses and air conditioning system are both being charged from the internal tank at the same time, and as such not all of the refrigerant coming out of the internal tank makes it into the air conditioning system since some will remain in the connecting hoses when they are disconnected. By compensating for the estimated amount that likely remains in the hoses, more refrigerant is "charged" out of the internal tank than the full charge amount of the air conditioning system (by amount that will be left in the hoses). This final step has helped with air conditioning systems receiving their full charge amounts, and has helped with the time it takes for servicing an air conditioner, so that the air conditioning system does not have to be turned on to pull the refrigerant out of the connecting hoses. But hoses can be swapped out, lengths and volumes of hoses may vary, and setting a constant compensation charge is not ideal.

In service environments, such as vehicular AC service shops, completing a refrigerant charge operation quickly is desired. The slow charge stage not only results in a longer total charge time, it also introduces two additional complications. Firstly, because of back pressure caused by the transfer of refrigerant into the air conditioning system under charge, hose compensation amounts may vary based upon the final back pressure at the end of the charge operation. Secondly, also because of back pressure, the pressure difference in the slow charge mode may be very small, and in some cases can approach equilibrium, which further slows the charging process.

Therefore, it is desired to perform a charge operation in a fast charge stage for as much of the duration of the process as possible. Ideally, the slow charge stage can be avoided entirely, leaving only a fast charge stage with accurate charging of the tank, and a minimal, compensation stage.

SUMMARY

One aspect of this disclosure is directed to a system configured to perform a refrigerant charge operation having a maximally-utilized fast-charge stage. In some embodiments of the aspect, an additional compensation mode may be utilized to optimize accuracy of the charge.

Another aspect of this disclosure is a method for performing a refrigerant charge operation accurately relying only on weight measurements of the refrigerant yet to be charged, and calculations based upon the weight measurements. In some embodiments, the weight measurements are utilized to determine the flow rate of refrigerant. In some embodiments, the average flow rate is calculated to compensate for short-term fluctuations in flow rate. The disclosure herein is further directed to performing such a method without specialized instruments to determine the flow rate of refrigerant.

The above aspects of this disclosure and other aspects will be explained in greater detail below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the a how to practice the disclosed concepts.

Figure 1:
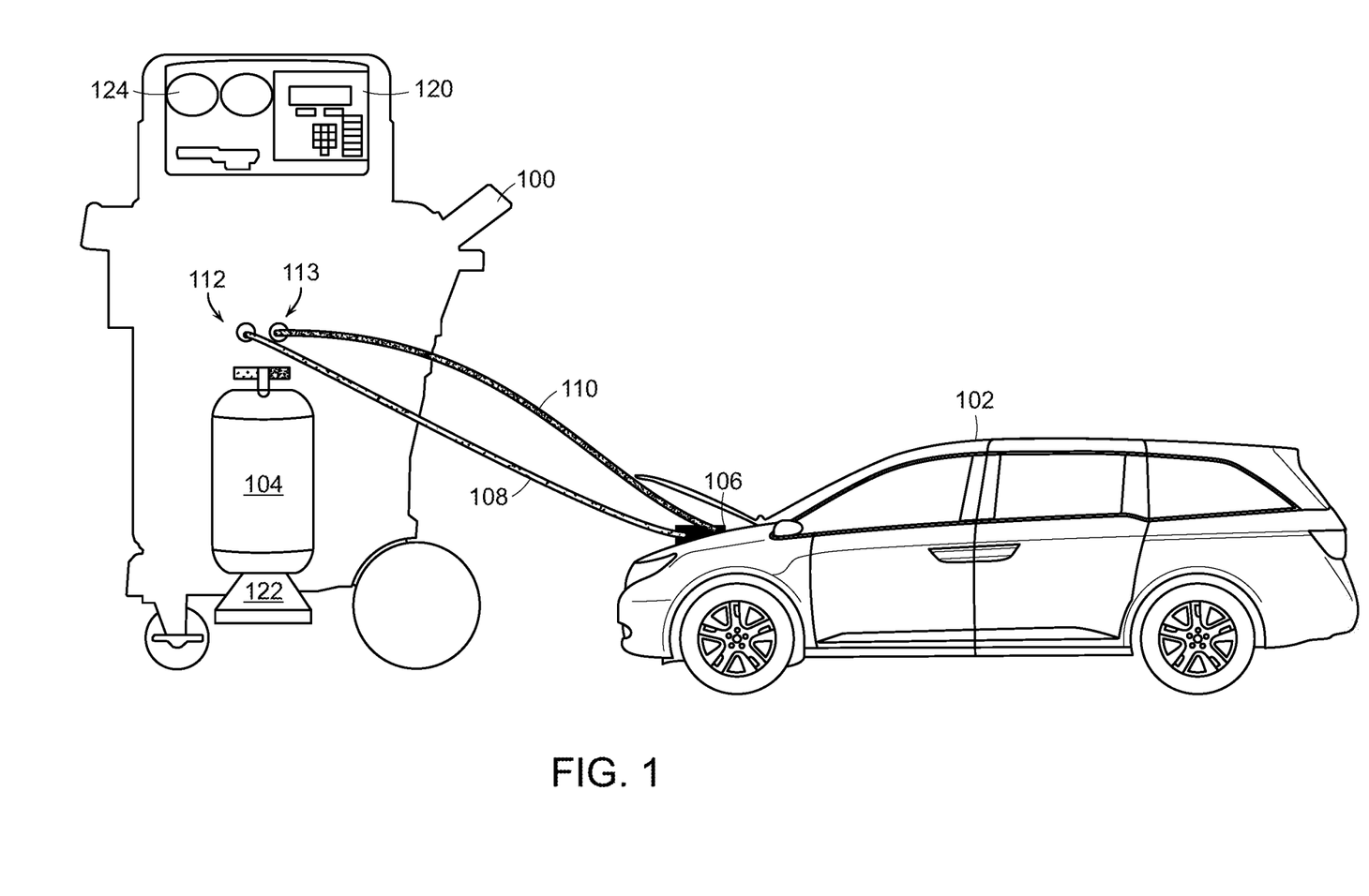
FIG. 1 is a diagrammatic illustration of a refrigerant charging system operably coupled to a vehicle air conditioning system to be charged, according to one embodiment of the disclosure herein.

FIG. 1 shows a diagrammatic view of an air conditioning service (ACS) system 100, shown here embodied as a service cart, operably coupled to an air conditioning system of a vehicle 102, shown here embodied as the AC of a vehicle. Although the exemplary embodiment shows ACS system 100 embodied as a service cart, this disclosure is intended to be illustrative and not limiting, as other embodiments are contemplated. Although the exemplary embodiments shows air conditioning system as embodied within a vehicle 102, this disclosure is intended to illustrative and not limiting, as other embodiments are contemplated.

ACS system 100 comprises an ACS internal tank 104 for recovering from and holding refrigerant to charge an air conditioner (AC) 106. ACS internal tank 104 is shown here external to the cart of ACS system 100, but other embodiments are contemplated. ACS system 100 is placed in fluid communication with AC 106 via a high-side hose 108 and a low-side hose 110. Flow of refrigerant from ACS internal tank 104 into AC 106 is controlled using at least one of a high-side solenoid 112 and a low-side solenoid 113.

Solenoid 112 and solenoid 113 are controlled by a controller 120. Controller 120 is depicted in this embodiment as a processor with user interface embodied within the service cart of ACS system 100, but other embodiments are contemplated, including a specialized processor device, a general-purpose processor having software instructions, a general-purpose processor having firmware instructions, a tablet processing device, a portable handheld processing device, a smart phone device, or any combination thereof. Controller 120 additionally reads measurements of a weight sensor 122, the weight sensor 122 monitoring the weight of refrigerant in ACS internal tank 104. In the depicted embodiment, weight sensor 122 is a calibrated scale external to ACS internal tank 104, but other embodiments are contemplated, such as an external scale calibrated to the entire ACS system 100. In one embodiment, weight sensor 122 is accurate to within 5 grams. ACS system 100 also comprises a clock 124, which, is configured to provide timing information to controller 120.

Figure 2:
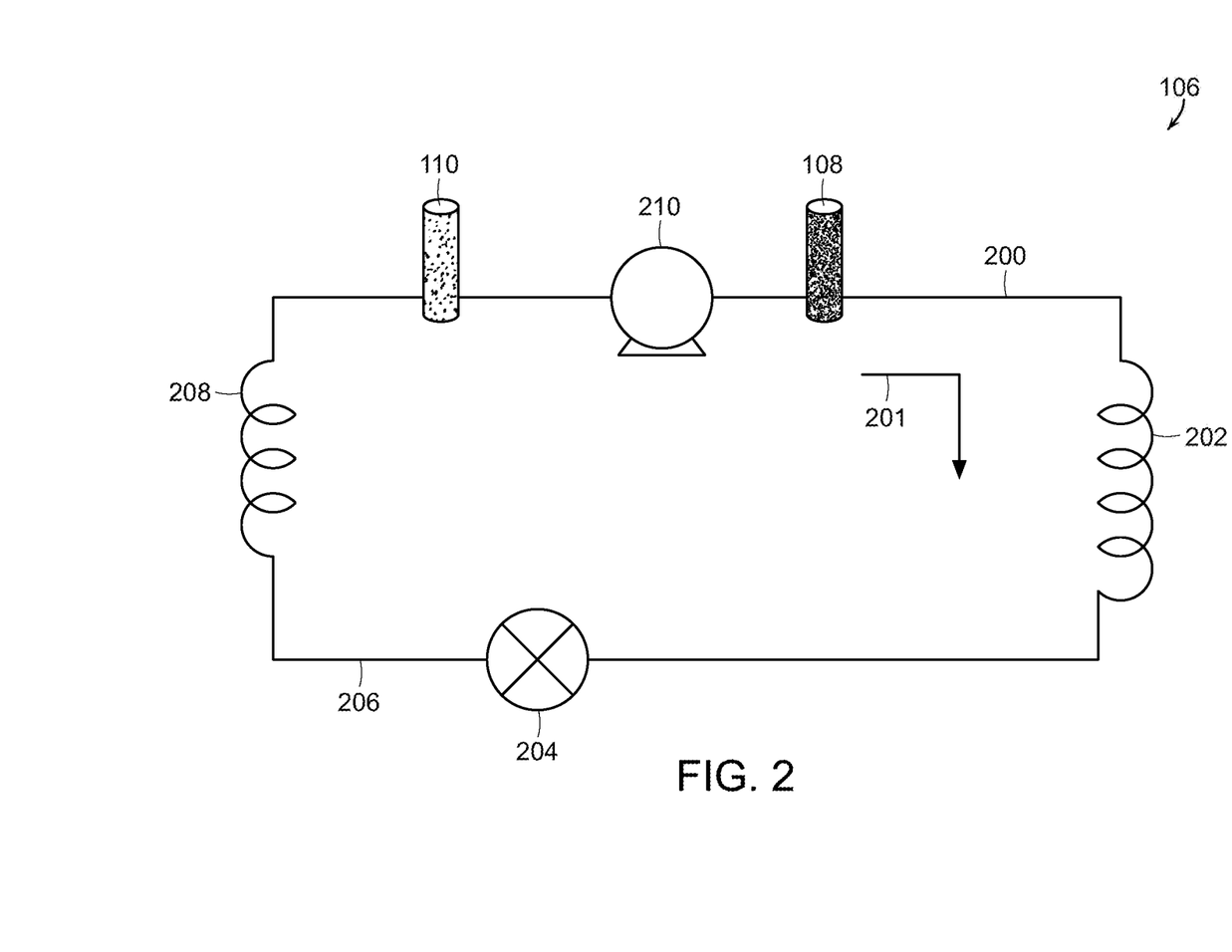
FIG. 2 is a diagrammatic illustration of an air conditioner during a refrigerant charging process according to an embodiment disclosed herein.

FIG. 2 is a diagrammatic view of the AC 106 during a charge operation. Refrigerant flows into AC 106 via one of low-side hose 108 or high-side hose 110. Typically, refrigerant is charged in liquid form via low-side hose 108, though the refrigerant may be charged into the system using either hose, or both hoses, in either a liquid or gaseous form. For the purposes of the illustration and not limitation, the disclosure herein will describe charging using only the low-side hose 108 to charge AC 106 with refrigerant in a liquid form. Refrigerant is charged, via low-side hose 108, into a liquid-side refrigerant line 200, and travels in liquid form in the direction 201 through the system. The system is charged with liquid refrigerant filling a condenser manifold 202, eventually arriving at an expansion joint 204. Expansion joint 204 causes a drop in pressure on the refrigerant, causing it to change into a gaseous form, which is then charged into a gaseous-side refrigerant line 206. The gaseous refrigerant continues to move in direction 201 through an evaporator manifold 208. After charging evaporator manifold 208, the gaseous refrigerant passes high-side hose 110 and charges to a compressor 210 to complete the charging of AC 106 FIG. 2 is a diagrammatic view representing one embodiment AC 106. Other components (e.g., an accumulator) may be included in AC 106 without deviating from the teachings herein.

Figure 3:
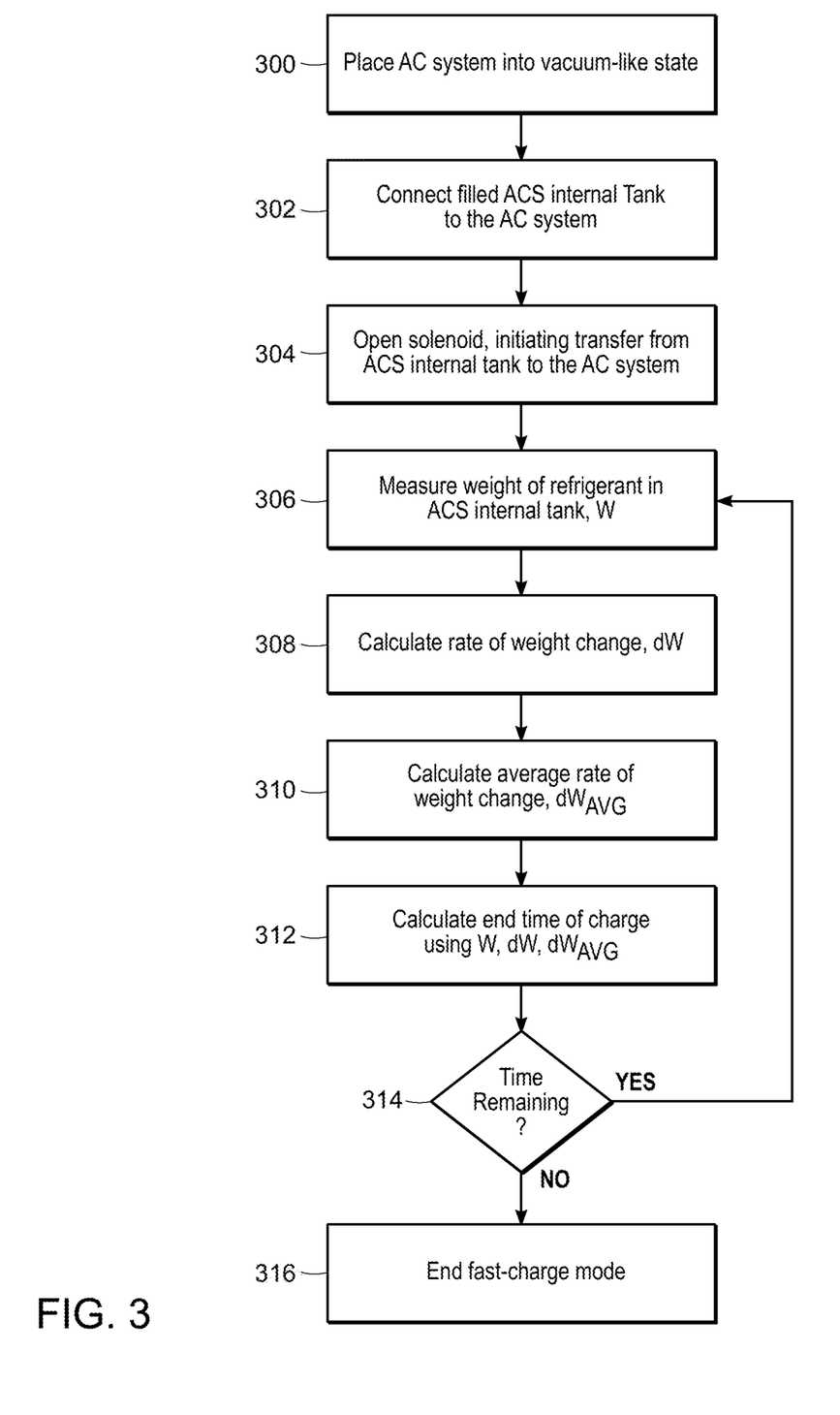
FIG. 3 is a flowchart showing a method of a fast-charge operation according to one embodiment of the disclosure herein.

FIG. 3 is a flowchart illustrating a method for performing an accurate fast charge operation according to the teachings herein. Prior to the start of the method, ACS internal tank 104 must be properly filled with the desired amount of refrigerant. The total amount of refrigerant in ACS internal tank 104 should be sufficient to charge the AC 106 with the proper amount designated by its specification. It is advantageous for ACS internal tank 104 to have more than the total desired amount of refrigerant to charge AC 106. In one embodiment, AC 106 has a capacity of 20 liters, but one of ordinary skill in the art will recognize that the teachings herein are not limited to a particular capacity of AC 106. It is further noted that ACS internal tank 104 must have a sufficient quantity of refrigerant to not only charge AC 106 to the designated capacity, but also to fill high-side hose 110 and low-side hose 108 during the charge process such that the proper quantity of refrigerant is charged into AC 106 without shorting the charge by the quantity remaining in the hoses. Thus, the total programmed quantity of refrigerant to be charged into ACS internal tank is defined as:

$$P = W_c + W_h$$

wherein P is the total programmed weight of refrigerant to properly complete a charging operation, $W_c$ is the designated capacity of the AC 106, and $W_h$ is the weight of additional refrigerant necessary to fill the hoses. $W_h$ will vary based upon the hoses being used, with more additional refrigerant being required for hoses having greater volume (e.g., longer hoses or hoses having greater diameter). Advantageously, hoses 108 and 110 are selected to be as short as is practical, in order to minimize the value of $W_h$. ACS internal tank 104 may take the form of a pre-filled charging tank having a designated quantity, or may be a conventional tank charged using the teachings herein or other known charging methods. It is further advantageous for ACS internal tank 104 to include an additional mass of refrigerant, e.g., 1 kg, to ensure a sufficient pressure differential is maintained to complete the charge operation.

In order to ensure that total quantity of refrigerant used during the charge operation is known, AC 106 must be properly emptied and placed in a vacuum-like state. This is accomplished in step 300 in FIG. 3. In one embodiment. AC 106 is placed in a vacuum of −670 mBar gauge that is maintained for at least 5 minutes, but one of ordinary skill in the art will recognize that the particular vacuum-like state will be designated by the specification of refrigerant. After properly preparing AC 106 into a suitable vacuum-like state, ACS internal tank 104 must be connected to AC 106 using hoses 108 and 110, as shown in step 302.

When filled ACS internal tank 104 is connected to AC 106, the pressure difference between the two will force refrigerant to flow from ACS internal tank 104 into AC 106. Solenoids 112 and 113 are thus initially closed to prevent unwanted flow of refrigerant. In step 304, solenoid 112 is opened to initiate the charging of AC 106.

During the charging, weight sensor 122 monitors the weight of refrigerant in ACS internal tank 104 at regular intervals according to clock 124. In one embodiment, measurements are taken every 0.25 seconds, but one of ordinary skill will recognize that other intervals may be used.

Controller 120 makes a record of the current weight of the refrigerant in ACS internal tank 104, W, as shown in step 306. At step 308, Controller 120 uses W to calculate the rate of change in the weight of the refrigerant, dW, by subtracting the value of W with the most-recently measured value thereof. At step 310, controller 120 then calculates an average rate of weight change, $dW_{AVG}$, by averaging dW with its previous nine most-recent values.

Using the values of W, dW, and $dW_{AVG}$, controller 120 calculates the remaining charge time in step 312. The remaining charge time is first calculated using the equation:

$$t_r = \frac{(W_c + W_h) - W}{dW_{AVG}}$$

wherein $t_r$ is the remaining charge time, W is current weight of refrigerant in ACS internal tank 104, $W_c$ is the designated capacity of the AC 106, and $W_h$ is the weight of additional refrigerant necessary to fill the hoses, and $dW_{AVG}$ is the average rate of weight change in ACS internal tank 104.

Remaining charge time $t_r$ is further adjusted based upon a comparison of dW and $dW_{AVG}$. The transfer of refrigerant from ACS internal tank 104 into AC 106 is accomplished based upon a pressure differential between ACS internal tank 104 and AC 106. As AC 106 is filled with refrigerant, the pressure differential decreases. As a result of the decrease in pressure differential, the rate of transfer dW also decreases. Because closing of solenoid 112 is not instantaneous, some amount of refrigerant will continue to flow while it is closing. The amount of refrigerant that additionally transfers while solenoid 112 closes corresponds directly to the value of dW, such that larger values of dW will yield more additional refrigerant. In practice, dW is highly variable. Thus, the value of $t_r$ is given additional adjustments based upon the value of $dW_{AVG}$, which is more stable. If $dW_{AVG}$ is larger than expected, the value of $t_r$ is lowered to prevent over-charging. If $dW_{AVG}$ is lower than expected, the value of $t_r$ is raised to prevent under-charging.

In an alternative embodiment, the value of $t_r$ is set to a predetermined value in relation to the value of $dW_{AVG}$. By way of illustration and not limitation, $t_r$ may for example be set to 3 seconds when the value of $dW_{AVG}$ is less than 10 grams/sec and set to 2 seconds when the value of $dW_{AVG}$ is between 10-20 grams/sec.

After remaining charge time t is calculated, a decision is made at step 314 as to whether the fast charge operation is completed. If $t_r$ is greater than the length of a single clock cycle, the controller 120 returns to step 306 for another clock cycle. If $t_r$ is not greater than the length of a single clock cycle, the fast-charge mode is ended at step 316. On the calculation of $t_r$, the solenoids are closed when it is determined that the charge will complete before the current clock cycle completes. In some embodiments, controller 120 then begins a compensation mode for the duration of one additional clock cycle. In some embodiments, controller 120 may instead close solenoid 113 before entering the compensation mode. In some embodiments, controller 120 may instead close solenoid 113 without continuing to a compensation mode, ending the charge after only the fast charge operation is complete.

Because the timing of the charge operation is based on the total weight of refrigerant within ACS internal tank 104, in some embodiments ACS system 100 may enter a compensation mode to accommodate for the refrigerant that has been removed from ACS internal tank 104 but remains in hoses 108, 110 rather than having been charged into AC 106.

Figure 4:
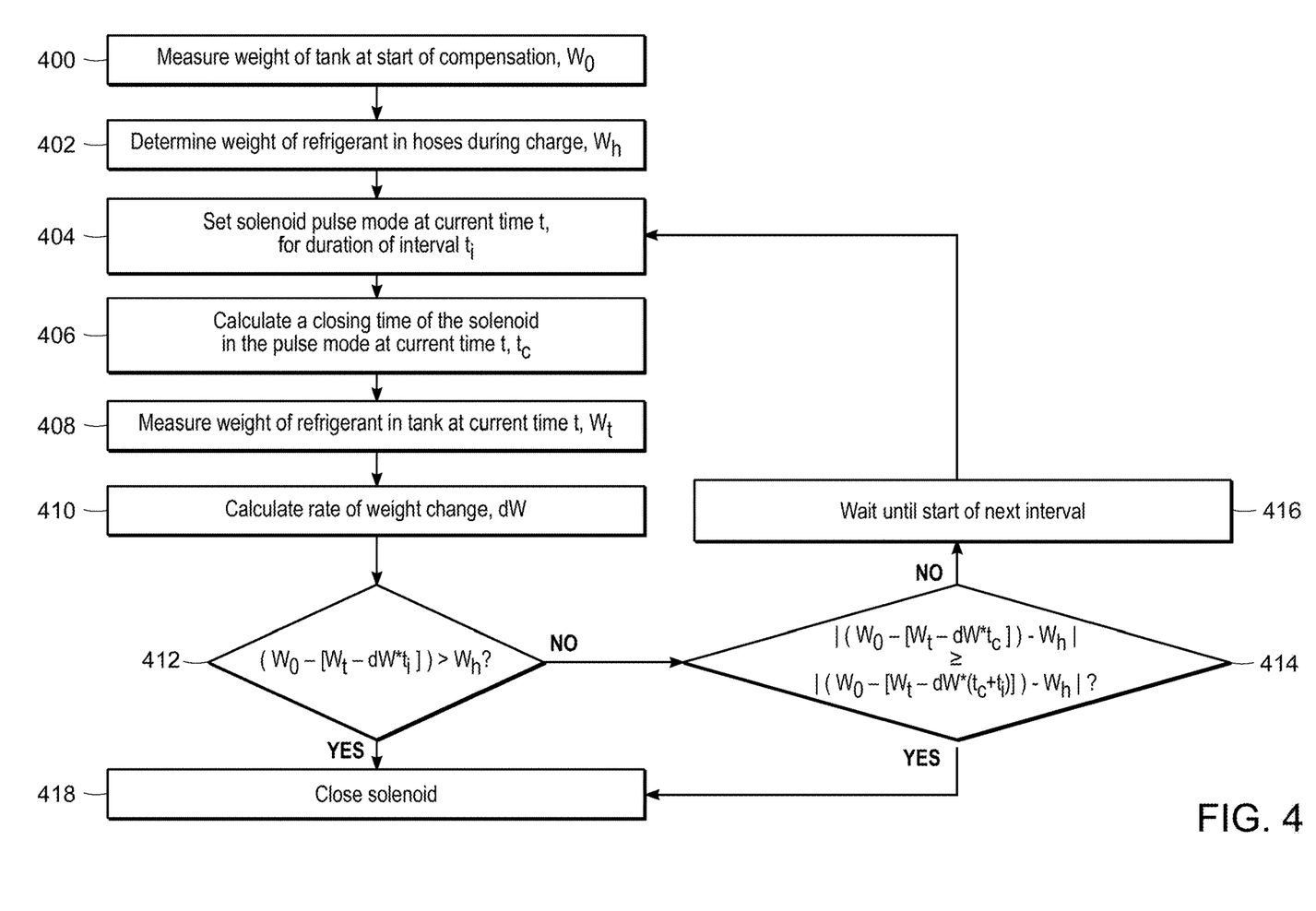
FIG. 4 is a flowchart showing a method of a compensation operation according to one embodiment of the disclosure herein.

FIG. 4 provides an exemplary embodiment of the compensation mode of the ACS system 100.

Beginning at step 400 of compensation, the weight of ACS internal tank 104 and its contents is measured using weight sensor 122. At step 402, the weight of the hoses when charged with refrigerant, $W_h$, is determined mathematically. The amount of refrigerant in the hoses is dependent upon the dimensions of the hoses, and the hose dimensions must be known prior to the compensation charge operation. In an embodiment disclosed herein, the dimensions of the hoses are known prior to the start of the compensation mode, and thus $W_h$ may be calculated prior to the start of the compensation mode.

Alternatively, the hose compensation can be determined using a calculation of back pressure. Because $dW_{AVG}$ provides a reference to the backpressure by showing the average flowrate of refrigerant as the pressure in AC 106 approaches equilibrium with the pressure of ACS internal tank 104, the corresponding hose compensation can be determined empirically as a function of $dW_{AVG}$.

At step 404, controller 120 places solenoid 113 into a pulse mode. It is noted that in the disclosed embodiment, only solenoid 113 is controlled during compensation mode, but other embodiments may control solenoid 112, additional solenoids, or any combination thereof without deviating from the teachings herein.

The pulse mode of step 404 is achieved using a modulated pulse signal from controller 120. The modulated pulse signal may be configured to control solenoid 112 to limit the flow of refrigerant to a desired flow rate. Advantageously, limiting the flow rate of the refrigerant enables the charge amount to be more precise than when charging is accomplished within a fast-charge mode. In the disclosed embodiment, the flow rate is limited such the amount of refrigerant charged into AC 106 is accurate to within 15 grams. The modulated pulse signal may be configured to oscillate solenoid 113 between an open and closed state at a frequency providing a desired flow rate. Because solenoid 113 does not move from an open state to a closed state instantaneously, pulse width, frequency, and amplitude may be configured such that solenoid is closed at regular intervals, for example at the start of the regular intervals indicated by clock 124. Advantageously, the compensation mode can therefore complete with solenoid 113 already in a fully-closed state.

Alternatively, because solenoid 113 does not react to the modulated pulse signal instantaneously, the modulated pulse signal may be configured to place solenoid 113 in a static partially-open state to limit the flow of refrigerant to a desired flow rate. Advantageously, because solenoid 113 is in a static partially-open state, the time to close the solenoid that state, $t_c$, is predictable and easily computed.

In another alternative, the pulse signal may be configured to oscillate solenoid 113 between a partially-open state and a closed state. Advantageously, this implementation provides the most accurate compensation results, because the slower flow rates result in a more predictable end result.

At step 406, the time required to close solenoid 112, $t_c$, is determined based upon the state of solenoid 112 dictated by the configuration of the modulated pulse signal and a predetermined time interval for measurement. Time $t_c$ must be re-calculated at the start of each time interval if the modulated pulse signal is adjusted, or if modulated pulse signal does not place solenoid 112 into the same position at the start of each time interval. For the purposes of the example herein, the modulated pulse signal places solenoid 112 into the same position at the start of each time interval, and maintains the position of solenoid 112 for a duration of that interval, $t_i$.

At step 408, the current weight of the refrigerant tank and its contents, $W_t$, is measured using weight sensor 122. The difference in $W_t$ at the current time t and the measured value in the previous time interval is also calculated in step 410 as dW, which provides the current rate of change of the weight of the refrigerant tank and its contents. The value of dW can be used to predict an additional amount of refrigerant that will be charged in a given time period, such as within the current time interval $t_i$, or during the time required to close solenoid 112 in its current position, $t_c$.

At step 412, the values of $W_t$ and dW are used to determine if the compensation charge has already completed. This is achieved using the equation $$(W_0 - [W_t - t_c * dW]) \geq W_h$$

wherein $W_0$ is the weight of ACS internal tank 104 and its contents at the start of the compensation mode, $W_t$ is the current weight, $t_c$ is the time required to close solenoid 112, dW is the current flow rate of refrigerant, and $W_h$ is the total calculated quantity of refrigerant in the hoses. Thus, if the quantity of refrigerant charged into AC 106 and amount expected to be charged during closing of solenoid 112 is equal to or greater the quantity within the hoses, compensation mode is completed, and solenoid 112 is closed at step 418. Because charging is uni-directional, delaying the close of solenoid 112 after the desired quantity of refrigerant has been charged into AC 106 will only yield a less accurate overcharge of refrigerant.

If it is not determined that the compensation mode has already completed its charge operation at step 412, it is then determined at step 414 whether the ending the compensation mode in the current time interval will yield the most accurate charge. The determination is made using the equation $$|(W_0 - [W_t - dW * t_c]) - W_h| \leq |(W_0 - [W_t - dW * (t_c + t_i)]) - W_h|$$

wherein $W_0$ is the weight of ACS internal tank 104 and its contents at the start of the compensation mode, $W_h$ is the current weight, $t_c$ is the time required to close solenoid 113, dW is the current flow rate of refrigerant, $W_h$ is the total calculated quantity of refrigerant in the hoses, and $t_i$ is the length of a time interval. This equation compares the quantity of refrigerant expected to be charged if the solenoid 113 is closed at the current time to the quantity of refrigerant expected to be charged if the solenoid 113 is closed at the start of the next time interval.

If closing solenoid 113 at the current time yields a value that is closer to the quantity of refrigerant in the hoses, $W_h$, then ending the compensation charge at the current time will yield an under-charge that is more accurate than the overcharge achieved if ending the compensation is delayed, and solenoid 113 is closed at step 418 to end the compensation charge. If the respective expected charge quantities are equivalent, compensation mode should also be ended at step 418. This is because when the expected quantities are equivalent there is no advantage in delaying the close of solenoid 113 because refrigerant charging only occurs in a single direction. However, if delaying the close of solenoid 113 will yield a more accurate charge of AC 106, then the charge should be continued until at least the start of the next time interval at step 416. At the start of the next time interval, the steps repeat again at step 404 and the sequence iterates until a condition is reached to advance to step 418 to complete the compensation charge.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. An air conditioner servicing (ACS) apparatus for charging an air conditioner (AC), comprising:
    a refrigerant tank;
    a number of detachable hoses configured to provide a fluid connection between the refrigerant tank and the AC;
    a weight sensor configured to measure the weight of the refrigerant tank and the contents of the refrigerant tank, the weight sensor further configured to provide a weight signal;
    a solenoid valve operable to control the flow of refrigerant between the refrigerant tank and the AC when in fluid communication with and disposed between the refrigerant tank and the AC;
    a clock operable to provide a time signal; and
    a controller in communication with the solenoid valve, the controller programmed to activate a fast-charge mode with the solenoid valve open in which refrigerant charges from the refrigerant tank to the AC, and upon receipt of the weight and time signals, programmed to extrapolate an ending time for completion of the fast-charge mode based on the rate of weight change, dW, and programmed to end the fast-charge mode at the ending time,
    wherein the controller is further programmed to, upon completion of the fast-charge mode, activate a hose-compensation mode.

2. The ACS apparatus of claim 1, wherein the controller is programmed to end the fast-charge mode by closing the solenoid valve.

3. The ACS apparatus of claim 1, wherein the controller is programmed to end the fast-charge mode by modulating the solenoid valve.

4. The ACS apparatus of claim 1, wherein the controller in the hose-compensation mode is programmed to subject the solenoid valve to a pulse-signal.

5. The ACS apparatus of 4, in which the controller is further programmed to define, or accept from a user, a known weight corresponding to an amount of refrigerant contained in the hoses, and to monitor the weight signals at fixed intervals and to close the solenoid valve when the known weight has been charged in hose-compensation mode.

6. The ACS apparatus of claim 1, wherein the controller in the fast-charge mode is further programmed to calculate the average rate of weight change of the refrigerant tank, $dW_{AVG}$, as an arithmetic mean of dW and a number of the most-recent values of dW, and to adjust the ending time based on the values of dW and $dW_{AVG}$.

7. The ACS apparatus of claim 6, wherein the controller is programmed to delay the ending time when dW is less than $dW_{AVG}$.

8. The ACS apparatus of claim 6, wherein the controller is programmed to expedite the ending time when dW is greater than $dW_{AVG}$.

9. The ACS apparatus of claim 6, wherein the controller is programmed to calculate $dW_{AVG}$ using the 10 most-recent values of dW.

10. A method of controlling the charge of refrigerant from a refrigerant tank of an air conditioner service (ACS) apparatus to an air conditioner (AC) in a vacuum-like state during a refrigerant charge operation, the method comprising:

connecting the refrigerant tank in a filled state to the AC using a number of hoses configured to regulate the flow of refrigerant using a solenoid valve, the solenoid valve being initially closed upon the connecting;

opening the solenoid valve such that refrigerant flows from the refrigerant tank to the AC;

measuring, with a weight sensor, the current weight of the refrigerant tank, W, and updating W at regular time intervals specified by a clock;

calculating, at each time interval, the value of a rate of change in weight of the refrigerant tank, dW, based on the difference in weight measurements;

calculating, at each time interval an average rate of change, $dW_{AVG}$ using the most recent dW value and a number of the next most-recent values of dW;

calculating, at each time interval, a charging end time using the W, dW and $dW_{AVG}$ values; and closing the solenoid to complete the charge operation when the clock indicates that the charging end time has been reached or surpassed.

11. The method of claim 10, wherein calculating the charging end time further comprises an adjustment of increasing the charging end time when dW is lower than $dW_{AVG}$.

12. The method of claim 10, wherein calculating the charging end time further comprises an adjustment of decreasing the charging end time when dW is greater than $dW_{AVG}$.

* * * * *